United States Patent [19]

Knowles

[11] Patent Number: 4,696,539

[45] Date of Patent: Sep. 29, 1987

[54] FIBER OPTIC CABLE CONNECTOR

[75] Inventor: Robert G. Knowles, Northfield, Conn.

[73] Assignee: Western Geophysical Company of America, Houston, Tex.

[21] Appl. No.: 633,704

[22] Filed: Jul. 23, 1984

[51] Int. Cl.[4] .............................................. G02B 6/36
[52] U.S. Cl. ................................. 350/96.21; 350/96.20
[58] Field of Search ................. 350/96.20, 96.21, 96.22

[56] References Cited

U.S. PATENT DOCUMENTS

| | | | |
|---|---|---|---|
| 3,649,098 | 3/1972 | Suverison | 350/96 B |
| 4,101,198 | 7/1978 | Heldt | 350/96.20 |
| 4,119,362 | 10/1978 | Holzman | 350/96.18 |
| 4,183,615 | 1/1980 | Rush | 350/96.21 |
| 4,183,618 | 1/1980 | Rush et al. | 350/96.18 |
| 4,192,575 | 3/1980 | Hodge | 350/96.21 |
| 4,290,667 | 9/1981 | Chown | 350/96.18 |
| 4,296,999 | 10/1981 | Mead | 350/96.21 |
| 4,371,233 | 2/1983 | Masuda | 350/96.20 |
| 4,380,366 | 4/1983 | Franken et al. | 350/96.21 |
| 4,391,487 | 7/1983 | Melman et al. | 350/96.20 |
| 4,421,383 | 12/1983 | Carlsen | 350/96.21 |
| 4,563,057 | 1/1986 | Ludman et al. | 350/96.21 X |

FOREIGN PATENT DOCUMENTS

| | | |
|---|---|---|
| 2722367 | 9/1977 | Fed. Rep. of Germany . |
| 2353069 | 3/1976 | France . |
| 2354969 | 8/1977 | France . |
| 1429843 | 3/1976 | United Kingdom . |
| 1579027 | 11/1980 | United Kingdom . |

*Primary Examiner*—William L. Sikes
*Assistant Examiner*—Akm E. Ullah
*Attorney, Agent, or Firm*—Brian L. Ribando; Barry C. Kane

[57] ABSTRACT

A connector for fiber optic cables includes an elongated tubular housing and a pair of termination assemblies which surround the end of each fiber optic cable. A lens element is adjacent one end of each termination assembly, and a sleeve surrounds each lens element and a portion of the termination assembly, and a lip on the sleeve spaces and coaxially aligns the lens elements one from the other.

11 Claims, 2 Drawing Figures

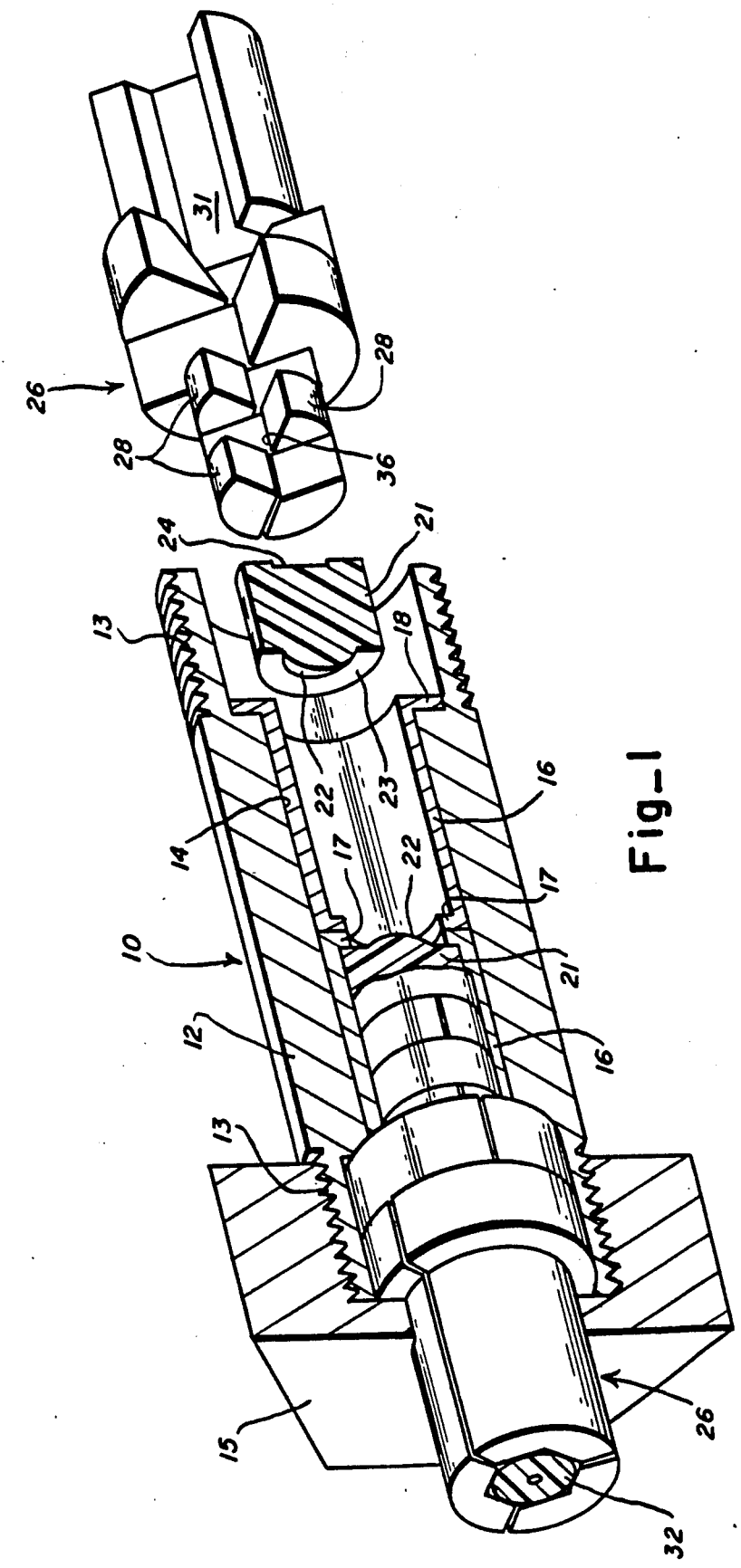
Fig_1

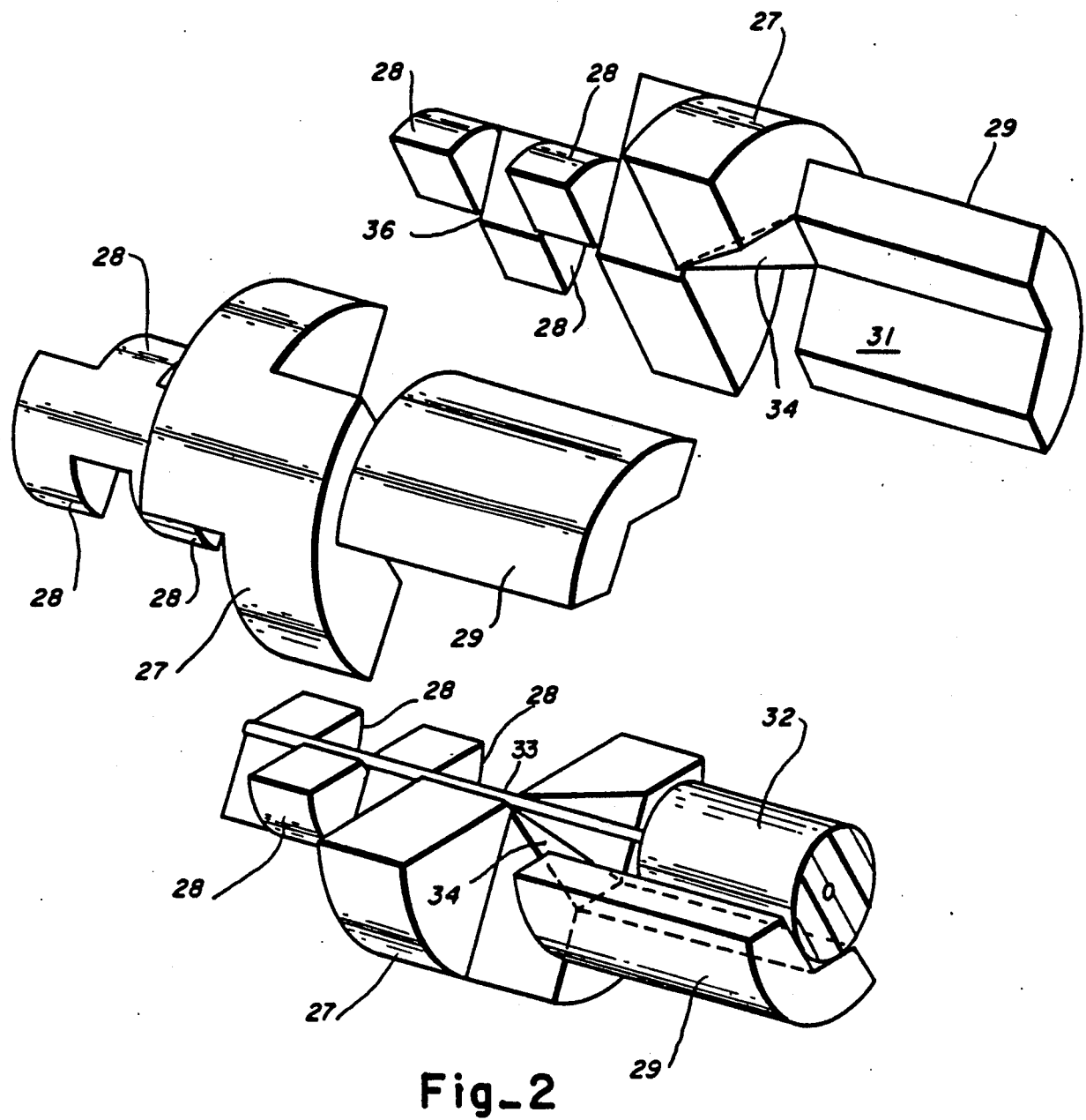
Fig_2

FIBER OPTIC CABLE CONNECTOR

BACKGROUND OF THE INVENTION

This invention relates to a connector for fiber optic cables.

Fiber optic cables are well known in the art. Such cables consist of very small diameter glass or plastic fibers independently buffered and covered with opague cladding material and are used for conducting optical signals from one place to another. Because the optic signal carried is immune to electrical noise and other interference, fiber optic cables are increasingly being used as a substitute for high speed data transmission and as well as audio and video transmission.

When it is desired to separably connect two fiber optic cable ends, it is necessary to secure the ends of fibers in exact axial alignment with one another, or with the focal point of a lens, in the case of lens-type connectors, in order to achieve maximum signal transmission. The holding device for the ends of the fiber must be able to be easily assembled onto the delicate fibers and must be capable of holding the fibers straight, secure, and concentric with each other without undue pressure. Most prior art connectors employ drilled holes or channels between rods to position the fibers. Tolerance variations in the fiber diameters and drill diameters adversely affect the ability to easily assemble the fiber while maintaining absolute fiber concentricity with such prior art constructions.

SUMMARY AND OBJECTS OF THE INVENTION

According to the invention, a connector for fiber optic cables comprises a tubular housing and a pair of multi-part termination assemblies. Each termination assembly receives the end of a fiber optic cable, and is mounted in the connector housing. A pair of lens elements are located within the housing by sleeves which coaxially align the lens elements one with the other. The metal sleeves also receive the forward end of the termination assemblies to align the optic fiber mounted in the termination assembly with the focal point of the lens element.

It is, therefore, an object of the invention to provide a connector for fiber optic cables which comprises multi-part termination assemblies which mount on the cable ends and are received by a tubular housing.

It is another object of the invention to provide a connector for fiber optic cables which comprises opposed lens elements held in axial alignment by sleeves which are mounted in a housing and which additionally receive the end of termination assemblies attached to the fiber optic cable.

These and other objects of the invention will become apparent from the following detailed description, of the drawings, wherein reference numerals used throughout the description designate like or corresponding parts shown on the drawing figures.

BRIEF DESCRIPTION OF THE DRAWINGS

FIG. 1 is a partial sectional view exploded of a fiber optic connector according to the invention.

FIG. 2 is an exploded view of the termination assembly shown in FIG. 1.

DESCRIPTION OF THE PREFERRED EMBODIMENT

Turning now to the drawing figures there is shown in FIG. 1 a fiber optic connector generally designated by the reference numeral 10. The connector comprises an elongated tubular housing 12 which may be treaded at each end 13 as shown for reception of a retaining nut 15. The housing 12 includes a through bore 14 which extends from one threaded end 13 to the other.

The connector additionally comprises a pair of sleeves 16 which are inserted into the through bore 14 from either end of the housing. Each sleeve 16 may comprise a precision drawn metal shell which includes a lip 17 on one end and a flange 18 on the other end. The sleeves 16 are dimensioned to receive a lens element 21 which may comprise molded plastic. The front surface of each lens element 21 comprises a convex lens 22 which is surrounded by a seating surface 23. The back of each lens element 21 is formed with a circular recess 24.

The fiber optic connector additionally includes two termination assemblies 26. Each termination assembly 26 comprises three identical termination portions 27. Each termination portion comprises a forward section including a plurality of angularly displaced arcuate lobes 28, and a rear arcuate portion 29 which when the termination portions 27 are assembled with one another form an entry port 31 on one end and a small fiber positioning channel 36 on the other end. The entry port 31 is dimensioned to receive the end of a fiber optic cable 32. Between the entry port 31 and the fiber positioning channel 36 is a tapered guideway 34 which diminishes in size from the size of the entry port 31 to the size of the fiber positioning channel 36 formed by the lobes 28.

METHOD OF USE OF THE PREFERRED EMBODIMENT

Three termination portions may be grouped as shown in FIG. 1 to form a termination assembly 26 including an entry port 31 at one end thereof and a fiber positioning channel 36 at the other end. Once three termination portions have been assembled, a fiber optic cable having a short length of the protective cladding removed from the end thereof may be inserted into the entry port 31. The tapered guideway 34 feeds the optic fiber 33 into the fiber positioning channel 36 until the end of the optic fiber is flush with the front face of the termination assembly 26.

The use of three termination portions 27 to form the fiber positioning channel 36 obviates the need to drill a long, thin bore in the termination assembly to receive the optic fiber. Also, because the lobes 28 of the several termination portions interlock with one another, there is no gap or slot along the fiber positioning channel 36 into which the optic fiber can slip. If desired, the fiber optic cable 32 can be positioned in the termination assembly so that the optic fiber 33 protrudes slightly from the fiber positioning channel 36. The end of the optic fiber can then be ground down and polished flush with the end of the termination assembly or, in the alternative, the fiber may be cleaved flush with the end of the termination assembly. A small amount of adhesive be may used to secure the portions 27 of the termination assembly to one another and to secure the fiber optic cable 32 in place within the assembly.

The sleeve 16 surrounds each lens element 21 and abutting termination assembly 26 within the housing 12. A precision drawn metal sleeve is preferred since tolerances can be held very exact for such a construction, and the alignment and spacing of the lens elements and termination assemblies are controlled by the sleeve. The lip 17 on the forward portion of each sleeve 16 provides a reference plane against which the seating surface 23 of the lens element 21 abuts, and the precise fit of the two sleeves 16 in the bore 14 acts to coaxially align the lens element 21 with one another. The forward lobe of the termination assembly 26 butts against the rear surface of the lens element 21. The recess 24 formed in the rear surface of the lens element 21 prevents the optic fiber held by the termination assembly from coming into contact with and scratching or being scratched by the lens element 21. A pair of threaded fasteners (only one shown) may be tightened onto the threaded surfaces 13 to hold the termination assemblies within the housing 12.

Having thus described the invention, various modifications and alterations thereof will become apparent to those skilled in the art, which modifications and alterations are intended to be within the scope of the invention as defined by the appended claims.

What is claimed is:

1. A connector for optical fibers, comprising:
   an elongated tubular housing having a bore therethrough
   a first and a second termination-assembly means, each surrounding an end of a optical fiber for positioning each optical fiber in said housing;
   a pair of lens elements, wherein one of the lens elements is adjacent one end of each termination-assembly means;
   a first and a second sleeve, each surrounding one lens element and a portion of said termination-assembly means adjacent each lens element; and
   means on each sleeve for spacing said lens element one from another, wherein each sleeve is mounted in the bore of said housing to coaxially align said pair of lens elements with each other.

2. The connector of claim 1 wherein each termination assembly includes:
   an entry port which surrounds said fiber optic cable,
   a fiber centering means which surrounds the optic fiber of said fiber optic cable, and
   a tapered guideway joining said entry port to said fiber positioning channel.

3. The connector of claim 2 further comprising:
   a plurality of separable termination portions comprising each termination assembly, each termination portion being identical to the other termination portions and having a length which is equal to the axial length of said termination assembly.

4. The connector of claim 3 wherein each termination portion comprises an arcuate segment of the termination assembly.

5. The connector of claim 4 further comprising:
   a plurality of lobes formed on each termination portion, said lobes being angularly displaced with each other to interlock with the lobes on the other termination portions, said lobes being positioned on said termination portions to form said fiber centering means when assembled with said other termination portions.

6. The connector of claim 1 further comprising:
   a convex lens formed on said lens element, and
   a seating surface surrounding said convex lens.

7. The connector of claim 6 further comprising:
   a lip formed on the end of each sleeve, wherein contact between the lip and the seating surface and between two abutting lips in an assembled connector spaces the lens elements from one another.

8. The connector of claim 1 further comprising:
   a precision drawn metal sleeve comprising said sleeve, whereby the axial alignment between the termination assemblies and lens elements may be accurately controlled by said sleeve.

9. A termination assembly for mounting on an end of an optical fiber in a fiber optic cable, the assembly comprising:
   a plurality of separable termination portions, identical to each other and adapted to interlock with each other, said plurality of termination portions further comprising;
   an entry port means for receiving said fiber optic cable;
   a fiber centering means for surrounding each, optical fiber of said fiber optic cable; and
   a tapered guideway joining said entry port means to said fiber centering means.

10. The connector of claim 9 wherein each termination portion comprises an arcuate segment of the termination assembly.

11. The connector of claim 10 further comprising:
    a plurality of lobes formed on each termination portion, said lobes being angularly displaced with each other to interlock with the lobes on the other termination portions, said lobes being positioned on said termination portions to form said fiber centering means when assembled with said other termination portions.

* * * * *